US011343412B2

(12) United States Patent
Sreepathihalli et al.

(10) Patent No.: US 11,343,412 B2
(45) Date of Patent: May 24, 2022

(54) USER DETECTION AND USER ATTENTION DETECTION USING MULTI-ZONE DEPTH SENSING

(71) Applicant: Intel Corporation, Santa Clara, CA (US)

(72) Inventors: Divyashree-Shivakumar Sreepathihalli, Santa Clara, CA (US); Michael Daniel Rosenzweig, San Ramon, CA (US); Uttam K. Sengupta, Portland, OR (US); Soethiha Soe, Beaverton, OR (US); Prasanna Krishnaswamy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 16/660,600

(22) Filed: Oct. 22, 2019

(65) Prior Publication Data

US 2020/0053257 A1 Feb. 13, 2020

(51) Int. Cl.
*H04N 5/222* (2006.01)
*H04N 5/232* (2006.01)
*G06T 7/521* (2017.01)
*G06T 7/136* (2017.01)

(52) U.S. Cl.
CPC ........... *H04N 5/2226* (2013.01); *G06T 7/136* (2017.01); *G06T 7/521* (2017.01); *H04N 5/232411* (2018.08)

(58) Field of Classification Search
CPC ... H04N 5/232411; G06T 7/521; G06T 7/136; G06F 1/3231
See application file for complete search history.

(56) References Cited

U.S. PATENT DOCUMENTS

| 7,379,560 | B2 * | 5/2008 | Bradski | G06F 1/3231 382/103 |
| 8,581,974 | B2 * | 11/2013 | Lin | G06K 9/00771 348/94 |
| 8,880,865 | B2 * | 11/2014 | Abernethy | G06F 1/3231 713/100 |
| 9,171,380 | B2 * | 10/2015 | Lee | G06T 7/194 |

(Continued)

OTHER PUBLICATIONS

"Human Presence Detection and Sensing" STMicroelectronics; Last accessed Jul. 18, 2019; https://www.st.com/en/applications/sensing/presence-sensing.html.

*Primary Examiner* — Boubacar Abdou Tchoussou
(74) *Attorney, Agent, or Firm* — Fletcher Yoder, P.C.

(57) ABSTRACT

An electronic device receives depth sensor data that includes depths sensed in multiple zones in the field of view of a depth sensor. The device determines whether a user is in front of the device based on the depth sensor data. If the user is determined to be present, then the device causes a display to enter an operational mode. Otherwise, the device causes the display to enter a standby mode. The device may also determine whether the user's attention is on the device by determining whether the depth sensor data indicates that the user is facing the device. If so, the device causes the display to enter the operational mode. Otherwise, the device causes the display to enter a power saving mode. The device may use a machine learning algorithm to determine whether the depth sensor data indicates that the user is present and/or facing the device.

21 Claims, 6 Drawing Sheets

(56) References Cited

U.S. PATENT DOCUMENTS

| | | | |
|---|---|---|---|
| 9,264,608 B2* | 2/2016 | Lee | H04N 5/23219 |
| 9,313,454 B2* | 4/2016 | Lalonde | G06K 9/00221 |
| 10,063,757 B2* | 8/2018 | Mark | G06F 1/1686 |
| 10,206,573 B2* | 2/2019 | Jeong | G06K 9/3233 |
| 10,313,570 B2* | 6/2019 | Mark | G06F 3/017 |
| 10,331,190 B2* | 6/2019 | Veiga | G06F 1/1618 |
| 10,573,273 B2* | 2/2020 | Huberman | G06F 3/0346 |
| 10,841,491 B2* | 11/2020 | Mathy | H04N 5/232411 |
| 2004/0175020 A1* | 9/2004 | Bradski | G06F 3/012 |
| | | | 382/103 |
| 2011/0273546 A1* | 11/2011 | Lin | G06K 9/00771 |
| | | | 348/61 |
| 2011/0296163 A1* | 12/2011 | Abernethy | G06F 1/3203 |
| | | | 713/100 |
| 2012/0044142 A1* | 2/2012 | Wu | G06F 1/3231 |
| | | | 345/158 |
| 2013/0141597 A1* | 6/2013 | Lee | G06T 7/194 |
| | | | 348/207.11 |
| 2014/0043498 A1* | 2/2014 | Lee | G06F 1/3231 |
| | | | 348/222.1 |
| 2014/0139631 A1* | 5/2014 | Mark | G06F 3/017 |
| | | | 348/46 |
| 2014/0368604 A1* | 12/2014 | Lalonde | H04N 7/147 |
| | | | 348/14.08 |
| 2017/0272651 A1* | 9/2017 | Mathy | H04N 13/122 |
| 2018/0129262 A1* | 5/2018 | Veiga | G06F 1/1681 |
| 2018/0235471 A1* | 8/2018 | Jeong | A61B 5/1118 |
| 2019/0384900 A1* | 12/2019 | Kosugi | G06F 21/32 |
| 2019/0385570 A1* | 12/2019 | Huberman | G06F 1/3231 |
| 2020/0142471 A1* | 5/2020 | Azam | G06F 21/32 |
| 2020/0278738 A1* | 9/2020 | Madar, III | G06N 3/0445 |
| 2020/0363857 A1* | 11/2020 | Kosugi | G06F 1/1616 |
| 2020/0393890 A1* | 12/2020 | Hayashi | G06F 1/3265 |
| 2021/0089105 A1* | 3/2021 | Iyer | G06F 1/324 |
| 2021/0089108 A1* | 3/2021 | Iyer | G06F 1/30 |
| 2021/0097960 A1* | 4/2021 | Welsch | G06F 1/3265 |
| 2021/0109486 A1* | 4/2021 | Hamlin | G06F 3/14 |

* cited by examiner

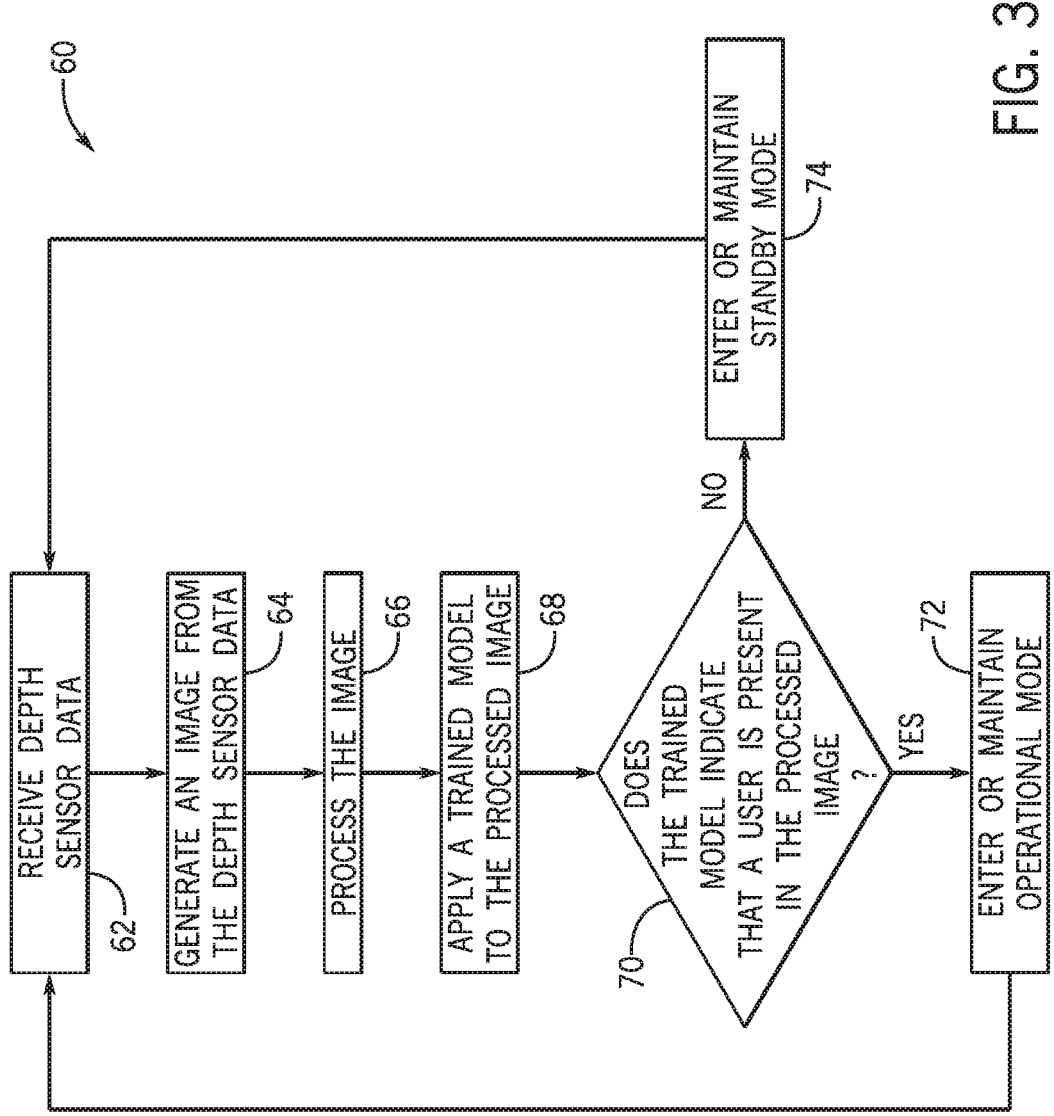

USER DETECTION AND USER ATTENTION DETECTION USING MULTI-ZONE DEPTH SENSING

BACKGROUND

This disclosure relates generally to saving power in electronic devices, and more particularly to saving power based on determining when a user is present and/or focused on the electronic device.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Certain electronic devices, such as personal computers, desktop computers, notebook computers, laptop computers, tablets, smart phones, wearable devices, and so on, may enter a low power mode (e.g., standby mode, sleep mode, or power saving mode) when, for example, the electronic device determines that a user has been inactive. In some cases, the electronic device may determine user inactivity based on images and/or videos captured by a camera of the electronic device. However, users may view the use of the camera as an undesirable invasion of privacy. Moreover, constant or periodic use of the camera to determine whether a user is present and/or focused on the electronic device may result in excessive power consumption.

BRIEF DESCRIPTION OF THE DRAWINGS

Various aspects of this disclosure may be better understood upon reading the following detailed description and upon reference to the drawings in which:

FIG. 3 is a flowchart illustrating a process for detecting whether a user is present (e.g., in front of the electronic device of FIG. 1) based on depth sensor data, according to embodiments of the present disclosure;

DETAILED DESCRIPTION

Figure 1:
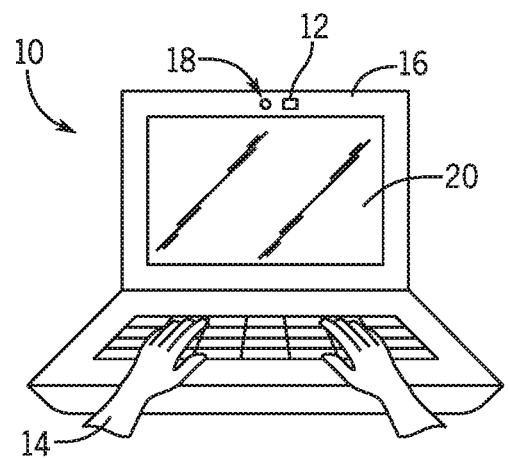
FIG. 1 is a diagram of an electronic device having a depth sensor, according to embodiments of the present disclosure.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

The presently disclosed systems and methods relate to electronic devices, such as personal computers, desktop computers, notebook computers, laptop computers, tablets, smartphones, wearable devices, and so on, which may receive depth sensor data from one or more depth sensors of the electronic device. The depth sensors may include any suitable sensors that detect a depth or distance to a nearest body, object, structure, or surface, such as a light-based depth sensor (e.g., a time-of-flight sensor using a laser or light-emitting diode, or an infrared sensor), a radio wave-based depth sensor (e.g., an ultra-wideband sensor, a radar sensor, or a WiFi sensor), a sound wave-based depth sensor (e.g., a sonar sensor), and so on. The depth sensor data may include depths sensed in multiple zones (e.g., as distributed in a 4×4 grid, 8×8 grid, 16×16 grid, 24×24 grid, or any other suitable zone distribution) of the depth sensor's field of view.

The electronic device may determine whether a user is present based on the depth sensor data. In particular, the electronic device may use a machine learning algorithm (e.g., a convolutional neural network, a support vector machine, or a k-nearest neighbor algorithm) to determine whether the depth sensor data indicates that a user is present. As such, the electronic device may differentiate when a user is present versus when an animal, such as a pet, runs in front of the depth sensor (e.g., as opposed to a motion sensor or a depth sensor that monitors a single zone). Compared to a camera, the resolution of the depth sensor data (e.g., 4×4, 8×8, 16×16, or 24×24) is significantly lower, such that most physical features of a user may not be identifiable in the depth sensor data. As such, the depth sensor data of a user may be captured without invading a user's privacy. Moreover, monitoring for a user using depth sensors may consume significantly less power and/or data than when using a camera.

If the electronic device determines that the user is present, then the electronic device may cause an electronic display of the electronic display to enter an operational mode (e.g., a "fully on" mode), or maintain the operational mode if the electronic display is already in the operational mode. If the electronic device determines that the user is not present, then the electronic device may cause the display to enter a standby mode (e.g., turning the display off to conserve power), or maintain the standby mode if the electronic device is already in the standby mode.

In additional or alternative embodiments, the electronic device may determine whether the user's attention is on the electronic device. That is, the electronic device may receive depth sensor data from the one or more depth sensors. The electronic device may determine whether the depth sensor data indicates that the user is facing the electronic device or away from (e.g., such that the user is facing the right or left of) the electronic device. Again, the electronic device may use a machine learning algorithm to determine whether the depth sensor data indicates a user is facing the electronic device. If so, then the electronic device may cause the electronic display to enter the operational mode, or maintain the operational mode if the display is already in the operational mode. If not, then the electronic device may cause the display to enter a power saving mode (e.g., by dimming the display), or maintain the power saving mode if the electronic display is already in the power saving mode.

In this manner, the presently disclosed systems and methods may conserve power by determining when a user is not present or when the user is not focused on the electronic device, while maintaining the user's privacy using low-resolution depth sensing that avoids revealing significant details of the user's physical characteristics. Moreover, depth sensing may provide a less resource-intensive method (e.g., compared to using a camera) of monitoring for the presence of a user, determining whether the user is present, and/or determining whether the user is focused on the electronic device.

With the foregoing in mind, FIG. 1 is a diagram of an electronic device 10 having a depth sensor 12, according to embodiments of the present disclosure. The electronic device 10 may include, for example, a desktop computer, notebook, laptop, tablet, a smartphone, a wearable device, a computing device, or any other suitable electronic device that may determine whether a user is present using a depth sensor 12.

The depth sensor 12 may include any suitable sensor that detects a depth or distance to a nearest body, object, structure, or surface, such as a light-based depth sensor (e.g., a time-of-flight sensor using a laser or light-emitting diode, or an infrared sensor), a radio wave-based depth sensor (e.g., an ultra-wideband sensor, a radar sensor, or a WiFi sensor), a sound wave-based depth sensor (e.g., a sonar sensor), and so on. In particular, the depth sensor 12 may send outgoing signals and receive return or bounceback signals (e.g. in response to the outgoing signals) used to detect depths of multiple zones (e.g., as distributed in a 4×4 grid, 8×8 grid, 16×16 grid, 24×24 grid, or any other suitable zone distribution) in the field of view of the depth sensor 12. While the term "field of view" is used in the disclosure, it should be understood that the term refers to the space that is available for the depth sensor 12 to measure depth, as the depth sensor 12 may not be an image capture device and thus may not be able to "view" anything in front of it. For example, as illustrated, a user 14 may be sitting in front of the electronic device 10. The depth sensor 12 may detect depths (e.g., ranges) of multiple zones (e.g., non-overlapping zones), some of which may include a portion of the user 14. A controller or processor of the electronic device 10 may determine that the user 14 is present and/or is focused on the electronic device 10 based on the sensed depths (e.g., in the field of view of the depth sensor 12).

Moreover, in some embodiments, the depth sensor 12 may additionally or alternatively detect signal strength of the return signal received in response to a sent signal. The signal strength may be indicative of reflectivity of the object (e.g., the user 14, a chair, or an animal), and may be used to identify the user 14 and/or determine an orientation of the user 14.

The depth sensor 12 may be located in any suitable position of the electronic device 10, such as in a base, lid, edge, top bezel portion, or side bezel portion, of the electronic device 10. For example, as illustrated in FIG. 1, the depth sensor 12 may be located in a top bezel portion 16 of the electronic device 10, next to a camera 18 of the electronic device 10.

The electronic device 10 also includes an electronic display 20, which may implement any suitable display technology, such as an electroluminescent (ELD) display, liquid crystal (LCD) display, light-emitting diode (LED) display, organic LED (OLED) display, active-matrix OLED display, plasma display panel (PDP), quantum dot LED (QLED) display, and so on. A controller or processor of the electronic device 10 may control the display 20 to enter certain power usage modes, such as an operational mode, a standby mode, a sleep mode, a power saving mode, a hibernation mode, or any other suitable mode. In the presently disclosed embodiments, the controller or processor may do so based on determining whether the user 14 is present and/or focused on the electronic device 10.

As described herein, the operational mode may include a "normal operation" mode, a "fully on" mode, or any other suitable mode that enables the user 14 to operate the electronic device 10. The standby mode, sleep mode, and power saving mode may each include a level of power saving, such as decreasing power used by and/or turning off certain components of the electronic device 10. For example, the standby mode may include turning off the display 20, while the power saving mode may include decreasing power used by the display 20 to cause the display 20 to dim. As such, the standby mode may take longer for the electronic device 10 to wake or enter the operational mode compared to the power saving mode. The hibernation mode may include saving a current configuration or workspace of the electronic device 10, and turning the electronic device 10 off. In such a case, the hibernation mode may take longer for the electronic device 10 to wake or enter the operational mode compared to the standby or power saving mode. In some cases, the hibernation mode may be combined with another power usage mode. For example, the sleep mode may initially cause the electronic device 10 to enter the standby mode and turn off the display 20, but after a threshold amount of time and/or if a power level of power source (e.g., a battery) of the electronic device 10 decreases beyond a threshold amount, the sleep mode may cause the electronic device 10 to enter the hibernation mode, saving the current configuration or workspace of the electronic device 10, and turning the electronic device 10 off.

Figure 2:
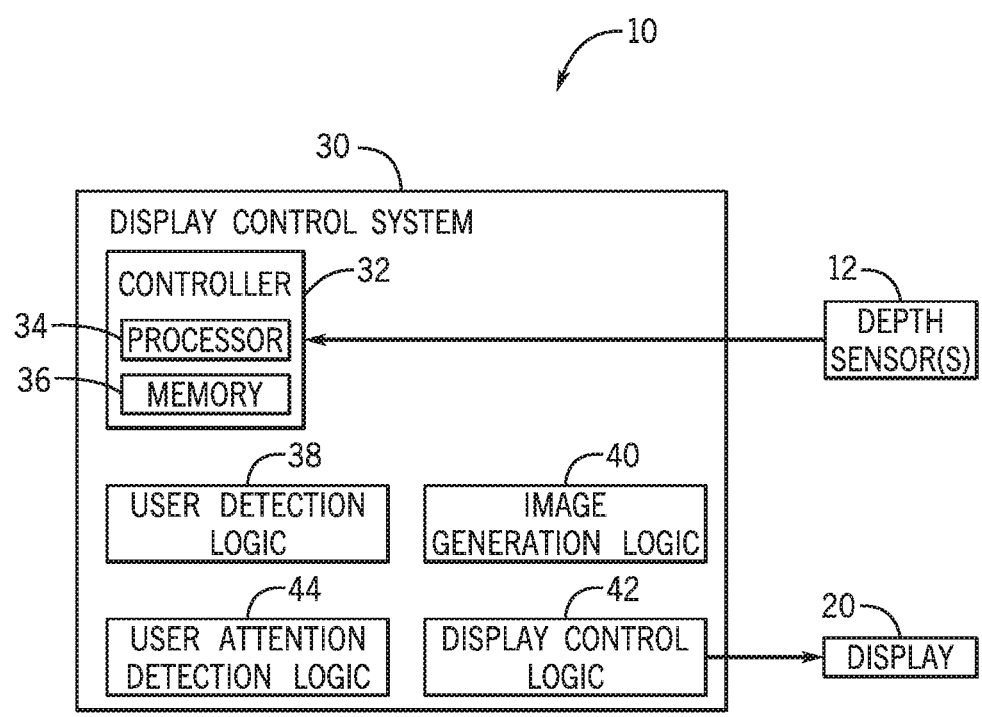
FIG. 2 is a block diagram of the electronic device having the depth sensor of FIG. 1, according to embodiments of the present disclosure.

FIG. 2 is a block diagram of the electronic device 10 having the depth sensor 12 of FIG. 1, according to embodiments of the present disclosure. The electronic device 10 may include a display control system 30 that controls the display 20 based on depth sensor data received from the depth sensor 12. The display control system 30 may include a controller 32 having one or more processors (illustrated as a single processor 34) and one or more memory or storage devices (illustrated as a single memory device 36).

The processor 34 may execute software programs and/or instructions stored in the memory device 36 that controls the display 20 based on depth sensor data received from one or more depth sensors (illustrated as the depth sensor 12). Moreover, the processor 34 may include multiple microprocessors, one or more "general-purpose" microprocessors, one or more special-purpose microprocessors, and/or one or more application specific integrated circuits (ASICS). For example, the processor 34 may include one or more reduced instruction set (RISC) processors. The memory device 36 may store information such as control software, look up tables, configuration data, and so forth. The memory device 36 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 36 may store a variety of information and may be used for various purposes, such as instructions that facilitate controlling the display 20 based on depth sensor data received from the depth sensor 12.

As such, the controller 32 may be communicatively coupled to the one or more depth sensors 12 and receive the depth sensor data from the one or more depth sensors 12. The depth sensor data may correspond to depths sensed in multiple zones (e.g., as distributed in a 4×4 grid, 8×8 grid, 16×16 grid, 24×24 grid, or any other suitable zone distribution) of the depth sensor's field of view. As such, when compared to a camera, for example, the resolution of the depth sensor data (e.g., 4×4, 8×8, 16×16, or 24×24) is significantly lower, such that most physical features of a user 14 may not be identifiable in the depth sensor data. As such, the depth sensor data of a user 14 may be captured without invading a user's privacy. Moreover, monitoring for a user 14 using a depth sensor 12 may consume significantly less power and/or data than when using a camera. For example, depth sensor data captured by a time-of-flight sensor used to determine whether a user 14 is present may be stored in the range of approximately 1-12 kilobytes, while image data captured by the lowest resolution camera may take up to 128 kilobytes.

The controller 32 may also be communicatively coupled to user detection logic 38 that determines whether a user is present (e.g., in front of the electronic device 10) based on the depth sensor data. In particular, the user detection logic 38 may receive the depth sensor data (e.g., indicative of multiple depth measurements, each corresponding to a zone of multiple zones in the field of view of the depth sensor 12), and send the depth sensor data to image generation logic 40 of the display control system 30 to generate a grayscale image. The term "logic" as used herein may include hardware (e.g., circuitry), software (e.g., processor-executable instructions), or a combination of the two.

The image generation logic 40 may use any suitable image generation technique, such as thresholding, to generate the image. In particular, the image generation logic 40 may assign a grayscale value (e.g., corresponding to a shade of gray) to each depth measurement of the depth sensor data corresponding to a zone of the field of view of the depth sensor 12. The grayscale values may then be aggregated or combined to form a grayscale image representative of the depth sensor data. For example, the image generation logic 40 may apply thresholding to the depth sensor data by comparing a depth measurement (e.g., corresponding to a zone) of the depth sensor data to one or more threshold depth ranges. If the depth measurement is within a threshold depth range, then the image generation logic 40 may represent the depth measurement as a corresponding grayscale value (e.g., shade or color).

As a basic example, if the depth measurement is less than or equal to a threshold depth, the image generation logic 40 may represent the depth measurement as a first value or a foreground value (e.g., black). If the depth measurement is greater than the threshold depth, the image generation logic 40 may represent the depth measurement as a second value or a background value (e.g., white). This process may be repeated for all depth measurements in the depth sensor data to generate a grayscale image having the first and second values (e.g., black and white colors).

The threshold depth and/or the threshold depth ranges may be set at any appropriate depth(s) that may render a suitably accurate or informative grayscale image (e.g., of the presence of the user 14), such as between one inch and ten feet, between one foot and five feet, between two feet and four feet (e.g., three feet), between 20 inches and 40 inches (e.g., 30 inches), and so on. It should be understood that any suitable image generation technique may be used by the image generation logic 40 to generate the image, and that thresholding is used as an illustrative example.

The image generation logic 40 may additionally or alternatively process and/or enhance the image using any suitable image processing techniques, such as image scaling, interpolation, sharpening, and/or thresholding techniques. That is, the image generation logic 40 may apply an image scaling technique (e.g., sinc resampling, Lanczos resampling, box sampling, mipmap, Fourier-transform methods, or vectorization) to the image by resizing, upscaling, or enhancing the resolution of the image. The image generation logic 40 may also or alternatively interpolate the depth sensor data to generate a higher resolution image by estimating higher resolution data points based on the data points of the image. For example, the image generation logic 40 may generate an enhanced or "zoomed in" image from the depth sensor data, and fill in or provide data points using interpolation techniques (such as nearest neighbor interpolation, bilinear interpolation, bicubic interpolation, or edge-directed interpolation). Additionally or alternatively, the image generation logic 40 may apply a sharpening technique to the image by emphasizing texture in, applying an "unsharp mask" to, reduce blurring in, the image. The image generation logic 40 may also or alternatively apply thresholding techniques to the image by applying threshold shade or color values or ranges (e.g., grayscale values or ranges) to the image, and generating a processed grayscale image with greater resolution. Ultimately, the processed image may provide a silhouette of the user 14.

The user detection logic 38 may then apply a model to the processed image generated by the image generation logic 40 that has been trained to identify when a user 14 is in front of the electronic device 10. To train the model, the model may be given sample data, which includes grayscale images of when a user 14 is in front of the electronic device 10 and when the user 14 is not in front of the electronic device 10. In some cases, for the grayscale images where the user 14 is not in front of the electronic device 10, the sample data may include grayscale images where objects (e.g., a chair) and/or animals (e.g., pets) are in front of the electronic device 10. The model may be given indications as to when the user 14 is or is not in front of the electronic device 10. Such a model may determine the presence of the user 14 with high accuracy (e.g., over 90% accuracy). Indeed, in test cases using a depth sensor 12 returning depth sensor data for an 8×8 grid, such a model returned 99% accuracy in determining whether a user 14 was in front of the electronic device 10. As such, the user detection logic 38 may more effectively save power in the electronic device 10 by decreasing the number of times the electronic device 10 returns from the standby or power saving mode to the operational mode due to non-user stimuli (e.g., as caused by an animal or pet).

The model may or may not use machine learning algorithms to identify when a user 14 is in front of the electronic device 10. In cases where the model uses machine learning algorithms, the model may use an artificial neural network, convolutional neural network, decision tree, support vector machine, Baynesian network, k-nearest neighbor, or any other suitable machine learning algorithm to determine whether a user 14 is in front of the electronic device 10. That is, the user detection logic 38 may build a mathematical model that uses the machine learning algorithms by receiving sample data (e.g., in the form of grayscale images of when a user 14 is in front of the electronic device 10 and when the user 14 is not in front of the electronic device 10), predicting whether the user 14 is in front of the electronic device 10 based on the sample data, and learning whether the prediction was true or false.

In this manner, the user detection logic 38 may differentiate between a user 14 being in front of the electronic device compared to, for example, an empty chair or an animal, such as a pet. Thus, the user detection logic 38 may enable greater accuracy than, for example, using a mere motion sensor or a depth sensor that monitors a single zone.

In some embodiments, the model may determine a score, percentage, or likelihood of a user 14 being in front of the electronic device 10 based on the processed image. The user detection logic 38 may compare the likelihood to a threshold likelihood (e.g., 1-99%, 10-90%, 25-75%, or 40-60%), and if the likelihood exceeds the threshold likelihood, then the user detection logic 38 may determine that the user 14 is in front of the electronic device 10. Otherwise, the user detection logic 38 may determine that the user 14 is not in front of the electronic device 10.

The display control system 30 may include display control logic 42 that controls operation of the display 20. In particular, the display control system 30 may place the display 20 in different power usage modes, including the operational mode, the standby mode, the sleep mode, the power saving mode, the hibernation mode, or any other suitable mode.

The controller 32 may instruct the user detection logic 38 to determine whether the user 14 is present, and, based on the determination, instruct the display control logic 42 to place the display 20 in an appropriate power usage mode. For example, if the user detection logic 38 determines that the user 14 is present, then the controller 32 may instruct the display control logic 42 to cause the display 20 to enter or maintain the operational mode. If the user detection logic 38 determines that the user 14 is not present, then the controller 32 may instruct the display control logic 42 to cause the display 20 to enter or maintain the standby mode to save power. As such, the display control system 30 may give the user 14 the perception of a smart system that is able to distinguish between a human and, for example, an animal.

The display control system 30 may also include user attention detection logic 44 that determines whether a user is focused on the electronic device 10 (e.g., has his or her attention on the electronic device 10) based on the depth sensor data. In particular, the user attention detection logic 44 may receive the processed grayscale image from the image generation logic 40. The user attention detection logic 44 may then apply a model to the processed image generated by the image generation logic 40 that has been trained to identify when a user is focused on the electronic device 10. To train the model, the model may be given sample data, which includes grayscale images of when a user 14 is focused on the electronic device 10 and when the user 14 is not focused on the electronic device 10.

For example, the user 14 may be focused on the electronic device 10 when he or she is facing the electronic device 10 and/or the display 20, and may not be focused on the electronic device 10 when he or she is facing away from the electronic device 10 and/or the display 20 (e.g., such that the user's face is directed to the right or left with respect to the electronic device 10 and/or the display 20). As such, the sample data corresponding to the user 14 being focused on the electronic device 10 may include grayscale images of when the user's face is directed toward the electronic device 10 and/or the display 20, while the sample data corresponding to the user 14 not being focused on the electronic device 10 may include grayscale images of when the user's face is directed toward the right or left with respect to the electronic device 10 and/or the display 20. The model may be given indications as to when the user 14 is or is not focused on the electronic device 10.

In some embodiments, the model may determine whether the user 14 is focused on the electronic device 10 based on aspects of the user 14 that may be unique to that user 14 (as opposed to other users). For example, the model may determine whether the user 14 is focused on the electronic device 10 by determining the location and/or orientation of certain aspects of the user's pose, such as the yaw and/or roll of the user profile (e.g., head and shoulder positions), the user's position in the field of view of the depth sensor 12, the orientation of any of the user's distinguishable features (e.g., hair, hairstyle, nose, and/or mouth), and so on. Head movements, such as turning to the left or right, may produce a unique signature or unique characteristics (e.g., head, shoulder, hair, and/or nose shape) across the multiple zones of the depth sensor data, which the model may learn to generalize with repeated observations.

In some embodiments, the depth sensor 12 may detect a signal strength of a return or bounceback signal received in response to sending an outgoing signal used to detect the depths of the multiple zones. The signal strength may be indicative of reflectivity of the object (e.g., the user 14), and may be used by the model of the user attention detection logic 44 to facilitate determining the location and/or orientation of the user's unique signature or unique characteristics (e.g., head, hair, hairstyle, shoulder, nose, and/or mouth). In such embodiments, the image generation logic 40 may generate the grayscale image based on the detected signal strengths. That is, the image generation logic 40 may assign a grayscale value (e.g., corresponding to a shade of gray) to each signal strength measurement of the depth sensor data corresponding to a zone of the field of view of the depth sensor 12. The grayscale values may then be aggregated or combined to form the grayscale image representative of the depth sensor data. In additional or alternative embodiments, the depths measurements and the signal strength measurements of the depth sensor data may be used in combination by the image generation logic 40 to generate the grayscale image. For example, for each zone, the image generation logic 40 may apply a first weight to a respective depth measurement and a second weight to a respective signal strength, and combine the weighted depth measurement and the weighted signal strength to determine the grayscale value for a respective zone.

Moreover, because these signatures and characteristics may be unique for each user 14, the model may learn to make associations through conjunction with other devices or components of the electronic device 10. For example, evidence of user focus on the electronic device 10 may be provided by input of a human interface device (e.g., a keyboard, a mouse, a trackpad, a trackball, or any other suitable input device) or another sensor (e.g., the camera 18), which may be combined with depth sensor data captured at the same time such evidence was captured to enable the model to make the association that such evidence is indicative of user focus. That is, a user's head turn from right to front may coincide with input by a mouse of the electronic device 10 and/or an image captured by the camera 18 showing the user's eyes looking at the display 20. Accordingly, the user attention detection logic 44 may train the model to associate the user's head turn from right to front with user focus on the electronic device 10.

In particular, the depth sensor 12 may detect signal strength of a return signal received in response to a sent signal. The signal strength may be indicative of reflectivity of the object (e.g., the user 14, a chair, or an animal), and may be used by the user attention detection logic 44 to determine the location and/or orientation of certain aspects of the user 14.

The model may or may not use machine learning algorithms to identify when a user 14 is focused on the electronic device 10. In cases where the model uses machine learning algorithms, the model may use an artificial neural network, convolutional neural network, decision tree, support vector machine, Baynesian network, k-nearest neighbor, or any other suitable machine learning algorithm to determine whether a user 14 is in front of the electronic device 10. That is, the user attention detection logic 44 may build a mathematical model that uses the machine learning algorithms by receiving sample data (e.g., in the form of grayscale images of when a user 14 is focused on the electronic device 10 and when the user 14 is not focused on the electronic device 10), predicting whether the user 14 is focused on the electronic device 10 based on the sample data, and learning whether the prediction was true or false. Such a model may determine the attention of the user 14 with high accuracy (e.g., over 90% accuracy). Indeed, in test cases using a model that implemented a one-dimensional convolutional neural network, the model successfully identified when the user 14 was focused on the electronic device 10 with 99% accuracy.

In some embodiments, the model may determine a score, percentage, or likelihood of whether a user 14 is focused on the electronic device 10 based on the processed image. The user attention detection logic 44 may compare the likelihood to a threshold likelihood (e.g., 1-99%, 10-90%, 25-75%, or 40-60%), and if the likelihood exceeds the threshold likelihood, then the user attention detection logic 44 may determine that the user 14 is in focused on the electronic device 10. Otherwise, the user attention detection logic 44 may determine that the user 14 is not focused on the electronic device 10.

Based on this determination by the user attention detection logic 44, the controller 32 may instruct the display control logic 42 to place the display 20 in an appropriate power usage mode. For example, if the user attention detection logic 44 determines that the user 14 is focused on the electronic device 10, then the controller 32 may instruct the display control logic 42 to cause the display 20 to enter or maintain the operational mode. If the user attention detection logic 44 determines that the user 14 is not focused on the electronic device 10, then the controller 32 may instruct the display control logic 42 to cause the display 20 to enter or maintain the power saving mode to save power. As such, the display control system 30 may give the user 14 the perception of a smart system that is able to distinguish when the user 14 is focused and is not focused on the electronic device 10.

In particular, the display control system 30 may continuously and/or periodically operate (whether there is a user 14 in front of the electronic device 10 or not), instructing the depth sensor 12 to capture depth sensor data in the field of view of the depth sensor 12, instructing the image generation logic 40 to generate a grayscale image based on the depth sensor data, instructing the user attention detection logic 44 to determine whether the user is present, and instructing the display control logic 42 to place the display 20 in an appropriate power usage mode. At some times, the user 14 may be actively using the electronic device 10, as evidenced by, for example, use of human interface devices (e.g., a keyboard, a mouse, a trackpad, a trackball, or any other suitable input device), or confirmation by another sensor (e.g., the camera 18). During such times, the depth sensor data may be used to further train the model used by the user attention detection logic 44 and improve its accuracy specific to the user 14 when he or she is focused on the electronic device 10.

Moreover, in some embodiments, the controller 32 may initially instruct the user detection logic 38 to determine whether the user is present, and if not, cause the display 20 to enter or maintain the standby mode. If the user detection logic 38 determines that the user is present, then the controller 32 may instruct the user attention detection logic 44 to determine whether the user 14 is focused on the electronic device 10, and instruct the display control logic 42 to place the display 20 in the appropriate power usage mode.

With the foregoing in mind, FIG. 3 is a flowchart illustrating a process 60 for detecting whether a user 14 is present (e.g., in front of the electronic device 10) based on depth sensor data, according to embodiments of the present disclosure. The process 60 may be performed by any suitable device that may control components of the electronic device 10 of FIG. 1, such as the display control system 30, the controller 32, the processor 34, the image generation logic 40, the user detection logic 38, the user attention detection logic 44, and/or the display control logic 42. While the process 60 is described using steps in a specific sequence, it should be understood that the present disclosure contemplates that the described steps may be performed in different sequences than the sequence illustrated, and certain described steps may be skipped or not performed altogether. In some embodiments, the process 60 may be implemented by executing instructions stored in a tangible, non-transitory, computer-readable medium, such as the memory device 36, using a processor, such as the processor 34.

As illustrated, in process block 62, the processor 34 receives the depth sensor data from the depth sensor 12. The depth sensor data may include depths (e.g., ranges) of multiple zones (e.g., non-overlapping zones) in the field of view of the depth sensor 12.

In process block 64, the processor 34 instructs the image generation logic 40 to generate an image from the depth sensor data. The image generation logic 40 may use any suitable image generation technique, such as thresholding, to generate the image. For example, the image generation logic 40 may apply thresholding to the depth sensor data by comparing a depth measurement (e.g., corresponding to a zone) of the depth sensor data to one or more threshold depth ranges. If the depth measurement is within a threshold depth range, then the image generation logic 40 may represent the depth measurement as a corresponding grayscale value (e.g., shade or color). This process may be repeated for all depth measurements in the depth sensor data to generate a grayscale image having the corresponding grayscale values.

In process block 66, the processor 34 processes or instructs the image generation logic 40 to process the image. In particular, the processor 34 and/or image generation logic 40 may process and/or enhance the image using any suitable image processing techniques, such as image scaling, interpolation, sharpening, and/or thresholding techniques.

Figure 4:
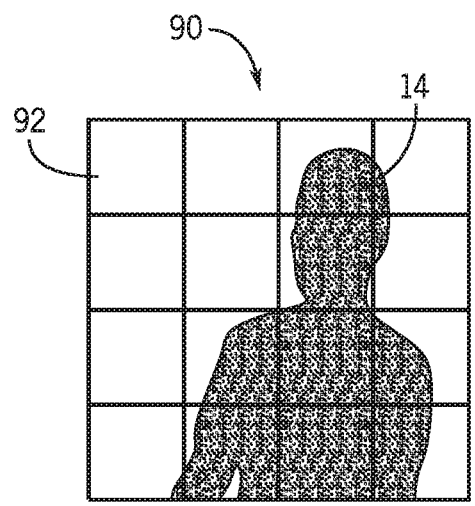
FIG. 4 is an example processed grayscale image of a user generated by image generation circuitry using depth sensor data, according to embodiments of the present disclosure.
Figure 5:
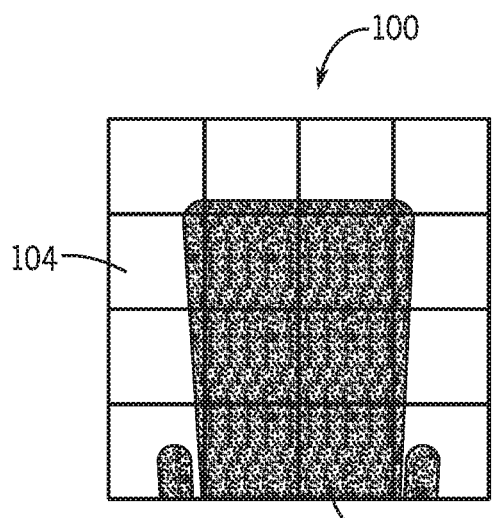
FIG. 5 is an example processed grayscale image of an empty chair generated by image generation circuitry using depth sensor data, according to embodiments of the present disclosure.
Figure 6:
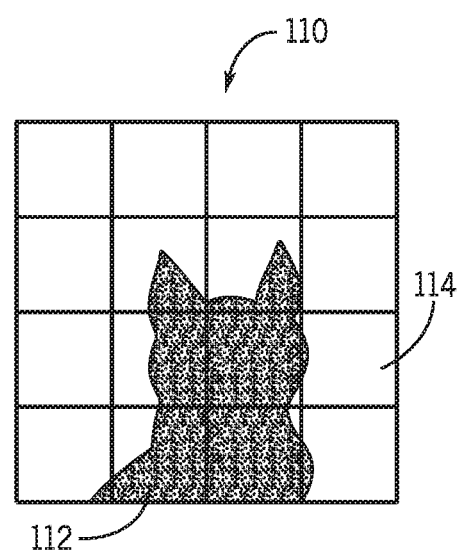
FIG. 6 is an example processed grayscale image of an animal (e.g., a dog) generated by image generation circuitry using depth sensor data, according to embodiments of the present disclosure.

In some embodiments, the processed image may provide a silhouette of the user 14. For example, FIG. 4 is an example processed grayscale image 90 of the user 14 generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 92). As another example, FIG. 5 is an example processed grayscale image 100 of an empty chair 102 generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 104). As yet another example, FIG. 6 is an example processed grayscale image 110 of an animal (e.g., a dog 112) generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 114).

In process block 68, the processor 34 instructs the user detection logic 38 to apply a trained model to the processed image. The model may be trained to identify when a user 14 is in front of the electronic device 10. To train the model, the model may be given sample data, which includes grayscale images of when a user 14 is in front of the electronic device 10, such as the example image 90 shown in FIG. 4. The sample data may also include grayscale images of when the user 14 is not in front of the electronic device 10, such as the example image 100 shown in FIG. 5. In some cases, for the grayscale images where the user 14 is not in front of the electronic device 10, the sample data may include grayscale images where animals (e.g., pets) are in front of the electronic device 10, such as the example image 110 shown in FIG. 6. The model may be given indications as to when the user 14 is or is not in front of the electronic device 10, and be trained based on the indications. Moreover, the model may or may not use machine learning algorithms to identify when a user 14 is in front of the electronic device 10.

In decision block 70, the user detection logic 38 determines whether the trained model indicates that the user 14 is present in the processed image. In some embodiments, the model may determine a score, percentage, or likelihood of a user 14 being in front of the electronic device 10 based on the processed image. The user detection logic 38 may compare the likelihood to a threshold likelihood, and if the likelihood exceeds the threshold likelihood, then the user detection logic 38 may determine that the user 14 is in front of the electronic device 10. Otherwise, the user detection logic 38 may determine that the user 14 is not in front of the electronic device 10.

If the user detection logic 38 determines that the trained model indicates that the user 14 is present in the processed image, then, in process block 72, the processor 34 instructs the display control logic 42 to cause the display 20 to enter or maintain the operational mode. That is, because the user detection logic 38 determined that the user is present, the display 20 should be in the operational mode to enable the user 14 to use the electronic device. The processor 34 then repeats the process 60 by returning to process block 62 to receive new depth sensor data. In some cases, the processor 34 may receive the new depth sensor data on a periodic basis (e.g., every one second to ten minutes, every five seconds to five minutes, or every ten seconds to one minute). In additional or alternative cases, the processor 34 may receive the new depth sensor data based on a triggering condition, such as the depth sensor 12, a motion sensor, the camera 18, and so on, indicating that a body (e.g., human, animal, or object) is approaching.

If the user detection logic 38 determines that the trained model indicates that the user 14 is not present in the processed image, then, in process block 74, the processor 34 instructs the display control logic 42 to cause the display 20 to enter or maintain the standby mode. That is, because the user detection logic 38 determined that the user is not present, the display 20 should be in the standby mode to save power. The processor 34 then repeats the process 60 by returning to process block 62 to receive new depth sensor data. In some cases, the processor 34 may receive the new depth sensor data on a periodic basis or based on a triggering condition.

In this manner, the process 60 may enable the display control system 30 to differentiate between a user 14 being in front of the electronic device compared to, for example, an empty chair or an animal, such as a pet, and more effectively save power in the electronic device 10 by decreasing the number of times the electronic device 10 returns from the standby mode to the operational mode due to non-user stimuli (e.g., as caused by an animal or pet). Thus, the process 60 may enable greater accuracy than, for example, using a mere motion sensor or a depth sensor that monitors a single zone. Moreover, the process 60 may determine the presence of the user 14 with high accuracy (e.g., over 90% accuracy), without capturing higher resolution images of the user 14 (such as when using a camera) and invading the user's privacy. Indeed, in test cases using a depth sensor 12 returning depth sensor data for an 8×8 grid, the process 60 returned 99% accuracy in determining whether a user 14 was in front of the electronic device 10.

Figure 7:
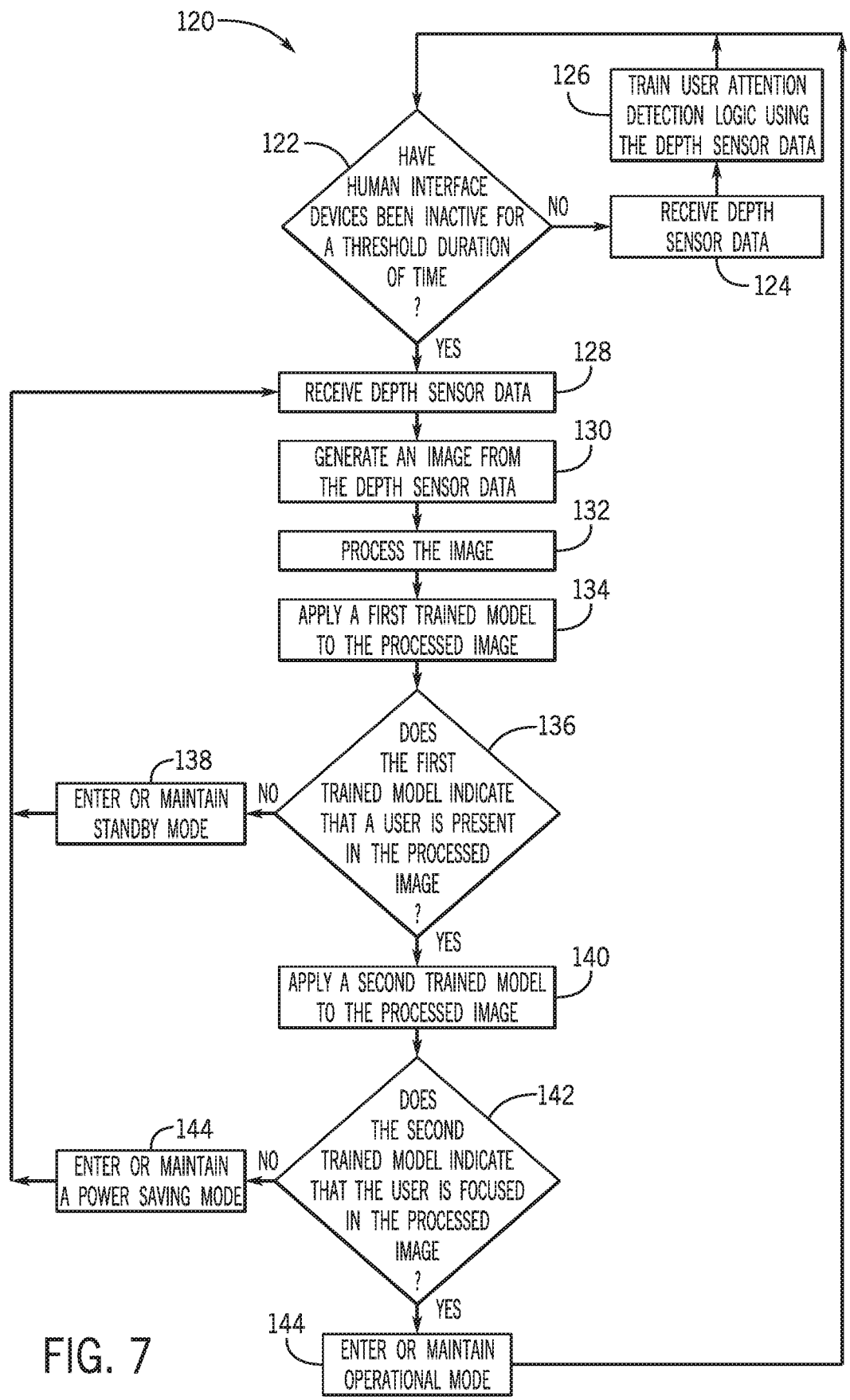
FIG. 7 is a flowchart illustrating a process for determining whether a user is present and determining whether the user's focus is on the electronic device of FIG. 1 based on depth sensor data, according to embodiments of the present disclosure.

Additionally or alternatively, the display control system 30 may determine whether the user 14 is focused on the electronic device 10. In particular, FIG. 7 is a flowchart illustrating a process 120 for determining whether a user is present and determining whether the user's focus is on the electronic device 10 based on depth sensor data, according to embodiments of the present disclosure. The process 120 may be performed by any suitable device that may control components of the electronic device 10 of FIG. 1, such as the display control system 30, the controller 32, the processor 34, the image generation logic 40, the user detection logic 38, the user attention detection logic 44, and/or the display control logic 42. While the process 120 is described using steps in a specific sequence, it should be understood that the present disclosure contemplates that the described steps may be performed in different sequences than the sequence illustrated, and certain described steps may be skipped or not performed altogether. In some embodiments, the process 120 may be implemented by executing instructions stored in a tangible, non-transitory, computer-readable medium, such as the memory device 36, using a processor, such as the processor 34.

As illustrated, in process block 122, the processor 34 determines whether one or more human interface devices (e.g., a keyboard, a mouse, a trackpad, a trackball, or any other suitable input device) have been inactive for a threshold duration of time. In additional or alternative embodiments, any other suitable device or component of the electronic device 10 may be used to determine whether there has been a lack of activity for the threshold duration of time, such as the camera 18 (which may capture images of the user 14 that the processor 34 may determine indicate the user 14 is not focused on the electronic device 10). The threshold duration of time may be any suitable duration that is indicative of the user 14 not focusing on the electronic device 10, such as within a range of ten seconds to ten minutes, 15 seconds to five minutes, or 30 seconds to two minutes.

If the processor 34 determines that the one or more human interface devices have not been inactive for the threshold duration of time, then the user 14 may be actively using the electronic device 10. As such, in process block 124, the processor 34 receives the depth sensor data from the depth sensor 12. The depth sensor data may include depths (e.g., ranges) of multiple zones (e.g., non-overlapping zones) in the field of view of the depth sensor 12. In process block 126, the processor 34 instructs the user attention detection logic 44 to train its model using the depth sensor data indicative of the user focusing on the electronic device 10. In this manner, the user attention detection logic 44 may improve its accuracy specific to the user 14 when he or she is focused on the electronic device 10. The processor 34 then repeats the process 120 by returning to process block 122 to determine whether the one or more human interface devices have been inactive for the threshold duration of time.

If the processor 34 determines that the one or more human interface devices have been inactive for the threshold duration of time, then, in process block 128, the processor 34 receives the depth sensor data from the depth sensor 12. The depth sensor data may include depths (e.g., ranges) of multiple zones (e.g., non-overlapping zones) in the field of view of the depth sensor 12.

In process block 130, the processor 34 instructs the image generation logic 40 to generate an image from the depth sensor data. The image generation logic 40 may use any suitable image generation technique, such as thresholding, to generate the image. For example, the image generation logic 40 may apply thresholding to the depth sensor data by comparing a depth measurement (e.g., corresponding to a zone) of the depth sensor data to one or more threshold depth ranges. If the depth measurement is within a threshold depth range, then the image generation logic 40 may represent the depth measurement as a corresponding grayscale value (e.g., shade or color). This process may be repeated for all depth measurements in the depth sensor data to generate a grayscale image having the corresponding grayscale values.

In process block 132, the processor 34 processes or instructs the image generation logic 40 to process the image. In particular, the processor 34 and/or image generation logic 40 may process and/or enhance the image using any suitable image processing techniques, such as image scaling, interpolation, sharpening, and/or thresholding techniques.

Figure 8:
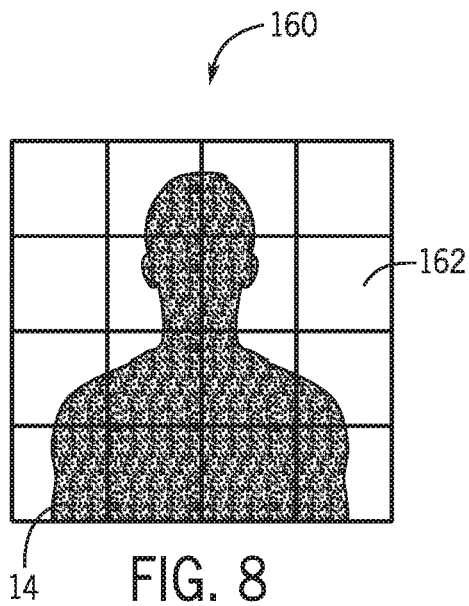
FIG. 8 is an example processed grayscale image of a user facing forward generated by image generation circuitry using depth sensor data, according to embodiments of the present disclosure.

In some embodiments, the processed image may provide a silhouette of the user 14 facing in a certain direction, which may indicate whether the user 14 is focused on the electronic device 10. For example, FIG. 8 is an example processed grayscale image 160 of the user 14 facing forward generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 162). Because the user 14 appears to be facing forward in the processed grayscale image 160, the processed grayscale image 160 may thus indicate that user 14 is paying attention to the electronic device 10.

Figure 9:
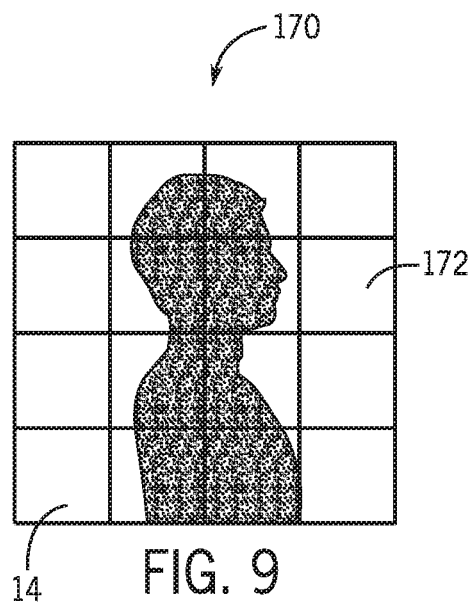
FIG. 9 is an example processed grayscale image of the user of FIG. 8 facing to the right with respect to the field of vision of a depth sensor generated by the image generation circuitry using depth sensor data, according to embodiments of the present disclosure.

As another example, FIG. 9 is an example processed grayscale image 170 of the user 14 facing to the right with respect to the field of vision of the depth sensor 12 generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 172). Because the user 14 appears to be facing to the right in the processed grayscale image 170, the processed grayscale image 170 may thus indicate that user 14 is not paying attention to the electronic device 10.

Figure 10:
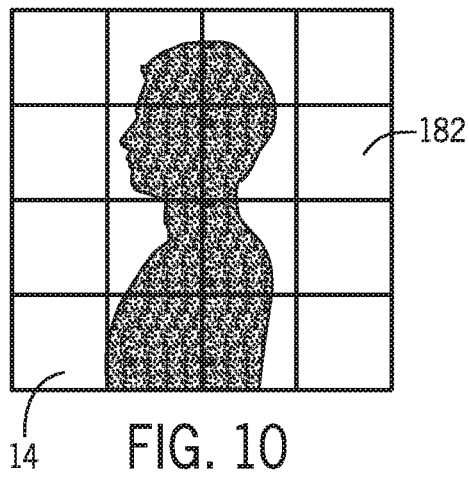
FIG. 10 is an example processed grayscale image of the user of FIG. 8 facing to the left with respect to the field of vision of a depth sensor generated by the image generation circuitry using depth sensor data, according to embodiments of the present disclosure.

Similarly, in yet another example, FIG. 10 is an example processed grayscale image 180 of the user 14 facing to the left with respect to the field of vision of the depth sensor 12 generated by the image generation logic 40 using depth sensor data, according to embodiments of the present disclosure. As indicated, the depth sensor data was provided by the depth sensor 12 detecting depths in a 4×4 grid (e.g., as evidenced by the 16 cells 182). Because the user 14 appears to be facing to the left in the processed grayscale image 180, the processed grayscale image 180 may thus indicate that user 14 is not paying attention to the electronic device 10.

In process block 134 the processor 34 instructs the user detection logic 38 to apply a first trained model to the processed image. The first model may be trained to identify when a user 14 is in front of the electronic device 10. To train the first model, the first model may be given sample data, which includes grayscale images of when a user 14 is in front of the electronic device 10, such as the example image 90 shown in FIG. 4. The sample data may also include grayscale images of when the user 14 is not in front of the electronic device 10, such as the example image 100 shown in FIG. 5. In some cases, for the grayscale images where the user 14 is not in front of the electronic device 10, the sample data may include grayscale images where animals (e.g., pets) are in front of the electronic device 10, such as the example image 110 shown in FIG. 6. The first model may be given indications as to when the user 14 is or is not in front of the electronic device 10, and be trained based on the indications. Moreover, the first model may or may not use machine learning algorithms to identify when a user 14 is in front of the electronic device 10.

In decision block 136, the user detection logic 38 determines whether the first trained model indicates that the user 14 is present in the processed image. In some embodiments, the first model may determine a score, percentage, or likelihood of a user 14 being in front of the electronic device 10 based on the processed image. The user detection logic 38 may compare the likelihood to a threshold likelihood, and if the likelihood exceeds the threshold likelihood, then the user detection logic 38 may determine that the user 14 is in front of the electronic device 10. Otherwise, the user detection logic 38 may determine that the user 14 is not in front of the electronic device 10.

If the user detection logic 38 determines that the first trained model indicates that the user 14 is not present in the processed image, then, in process block 138, the processor 34 instructs the display control logic 42 to cause the display 20 to enter or maintain the standby mode. That is, because the user detection logic 38 determined that the user is not present, the display 20 should be in the standby mode to save power (e.g., by turning off the display 20). The processor 34 then returns to process block 128 to receive new depth sensor data. In some cases, the processor 34 may receive the new depth sensor data on a periodic basis (e.g., every one second to ten minutes, every five seconds to five minutes, or every ten seconds to one minute). In additional or alternative cases, the processor 34 may receive the new depth sensor data based on a triggering condition, such as the depth sensor 12, a motion sensor, the camera 18, and so on, indicating that a body (e.g., human, animal, or object) is approaching.

If the user detection logic 38 determines that the first trained model indicates that the user 14 is present in the processed image, then, in process block 140, the processor 34 instructs the user attention detection logic 44 to apply a second trained model to the processed image. The second model may be trained to identify when a user 14 is focused on the electronic device 10. To train the second model, the second model may be given sample data, which includes grayscale images of when a user 14 is focused on the electronic device 10, such as the example image 160 shown in FIG. 8. The sample data may also include grayscale images of when the user 14 is not focused on the electronic device 10, such as the example images 170, 180 shown in FIGS. 9 and 10. The second model may be given indications as to when the user 14 is or is not focused on the electronic device 10, and be trained based on the indications. Moreover, the second model may or may not use machine learning algorithms to identify when a user 14 is focused on the electronic device 10.

In some embodiments, the depth sensor 12 may detect a signal strength of a return or bounceback signal received in response to sending an outgoing signal used to detect depths of multiple zones. The signal strength may be indicative of reflectivity of the object (e.g., the user 14), and may be used by the user attention detection logic 44 to determine the location and/or orientation of certain aspects (e.g., head, hair, hairstyle, shoulder, nose, and/or mouth) of the user 14.

Figure 11:
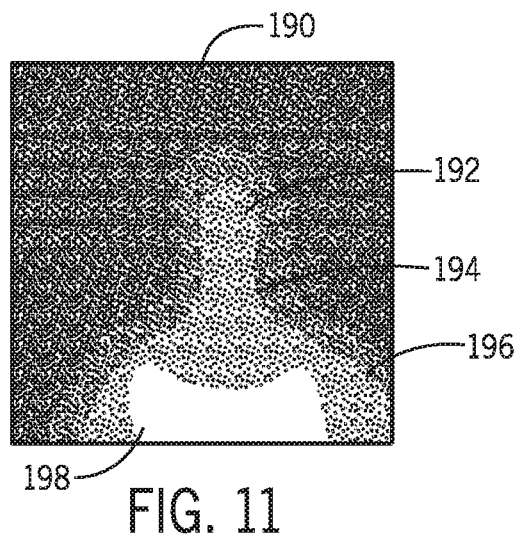
FIG. 11 is an example processed grayscale image of a user facing forward generated by image generation circuitry using reflectivity derived from the signal strength of depth sensor data, according to embodiments of the present disclosure.

For example, FIG. 11 is an example processed grayscale image 190 of the user 14 facing forward generated by the image generation logic 40 using reflectivity derived from the signal strength of the depth sensor data, according to embodiments of the present disclosure. As illustrated, the location and/or orientation of certain aspects, such as the head 192, neck 194, shoulders 196, and chest 198 of the user 14 may be recognized by generating the image 190 using reflectivity derived from the signal strength of the depth sensor data. Because the user 14 appears to be facing forward in the processed grayscale image 190, the processed grayscale image 190 may thus indicate that user 14 is paying attention to the electronic device 10.

Figure 12:
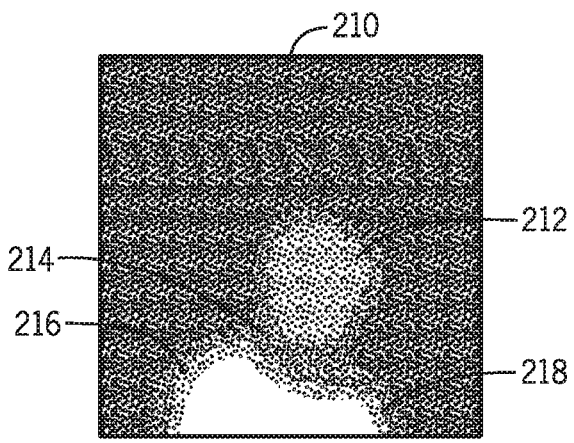
FIG. 12 is an example processed grayscale image of a user facing to the right generated by the image generation circuitry using reflectivity derived from the signal strength of depth sensor data, according to embodiments of the present disclosure.

As another example, FIG. 12 is an example processed grayscale image 210 of the user 14 facing to the right with respect to the field of vision of the depth sensor 12 generated by the image generation logic 40 using reflectivity derived from the signal strength of the depth sensor data, according to embodiments of the present disclosure. As illustrated, the location and/or orientation of certain aspects, such as the head 212, neck 214, left shoulder 216, and right shoulder 218 of the user 14 may be recognized by generating the image 210 using reflectivity derived from the signal strength of the depth sensor data. In particular, the user attention detection logic 44 may determine that the left shoulder 216 is closer to the electronic device 10 than the right shoulder 218 due to the larger size and/or whiter or brighter representation of the left shoulder 216 in the image 210. Because the user 14 appears to be facing to the right in the processed grayscale image 210, the processed grayscale image 210 may thus indicate that user 14 is not paying attention to the electronic device 10.

Figure 13:
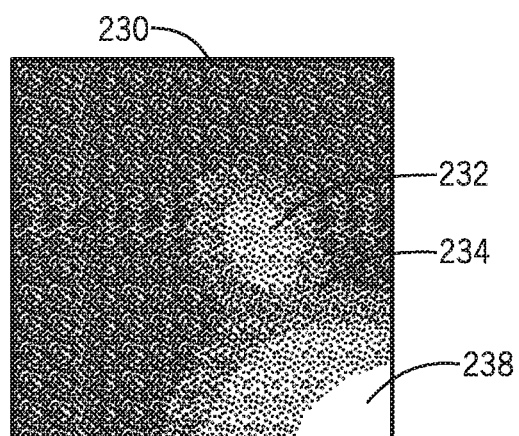
FIG. 13 is an example processed grayscale image of a user facing to the left generated by the image generation circuitry using reflectivity derived from the signal strength of depth sensor data, according to embodiments of the present disclosure.

Similarly, in yet another example, FIG. 13 is an example processed grayscale image 230 of the user 14 facing to the left with respect to the field of vision of the depth sensor 12 generated by the image generation logic 40 using reflectivity derived from the signal strength of the depth sensor data, according to embodiments of the present disclosure. As illustrated, the location and/or orientation of certain aspects, such as the head 232, neck 234, left shoulder 236, and right shoulder 238 of the user 14 may be recognized by generating the image 230 using reflectivity derived from the signal strength of the depth sensor data. In particular, the user attention detection logic 44 may determine that the right shoulder 238 is closer to the electronic device 10 than the left shoulder 236 due to the larger size and/or whiter or brighter representation of the right shoulder 238 in the image 230. Because the user 14 appears to be facing to the right in the processed grayscale image 230, the processed grayscale image 230 may thus indicate that user 14 is not paying attention to the electronic device 10.

In decision block 142, the user attention detection logic 44 determines whether the second trained model indicates that the user 14 is focused on the electronic device 10 in the processed image. In some embodiments, the second model may determine a score, percentage, or likelihood of a user 14 being focused on the electronic device 10 based on the processed image. The user attention detection logic 44 may compare the likelihood to a threshold likelihood, and if the likelihood exceeds the threshold likelihood, then the user attention detection logic 44 may determine that the user 14 is in focused on the electronic device 10. Otherwise, the user attention detection logic 44 may determine that the user 14 is not focused on of the electronic device 10.

If the user attention detection logic 44 determines that the trained model indicates that the user 14 is not focused on the electronic device 10 in the processed image, then, in process block 144, the processor 34 instructs the display control logic 42 to cause the display 20 to enter or maintain the power saving mode. That is, because the user attention detection logic 44 determined that the user is not focused on the electronic device 10, the display 20 should be in the power saving to save power by, for example, dimming the display 20. The processor 34 may not instruct the display control logic 42 to cause the display 20 to enter or maintain the standby mode, as in process block 138, as, in this case, the user 14 is present, and may turn his or her attention back to the electronic device 10. As such, it may be desirable to return the electronic device 10 back to the operational mode in less time than one the user 14 is not present (as is the case in process block 138). The processor 34 then returns to process block 128 to receive new depth sensor data. In some cases, the processor 34 may receive the new depth sensor data on a periodic basis or based on a triggering condition.

Otherwise, if the user attention detection logic 44 determines that the trained model indicates that the user 14 is focused on the electronic device 10 in the processed image, then, in process block 144, the processor 34 instructs the display control logic 42 to cause the display 20 to enter or maintain the operational mode. That is, because the user attention detection logic 44 determined that the user is focused on the electronic device 10, the display 20 should be in the operational mode to enable the user 14 to use the electronic device. The processor 34 then returns to process block 128 to receive new depth sensor data. In some cases, the processor 34 may receive the new depth sensor data on a periodic basis or based on a triggering condition.

In this manner, the process 120 may enable the display control system 30 to detect when a user 14 is present and whether the user 14 is focused on the electronic device 10, and reduce power supplied to, for example, the display 20 accordingly. Moreover, the process 120 may enable the display control system 30 to return from a reduced power mode more quickly when the user 14 is present, but no paying attention, compared to when the user 14 is not present. As such, the process 120 may be more effective in saving power in the electronic device 10, without capturing higher resolution images of the user 14 (such as when using a camera) and invading the user's privacy. Moreover, the process 120 may determine the presence and focus of the user 14 with high accuracy (e.g., over 90% accuracy). Indeed, in test cases using a model that implemented a one-dimensional convolutional neural network, the process 120 successfully identified when the user 14 was focused on the electronic device 10 with 99% accuracy.

It should be understood that, in some embodiments, the process 120 may not including determining whether the user 14 is present, and focus on determining whether the user 14 is paying attention to the electronic device 10, thus skipping process blocks 134 and 138 and decision block 136.

While the embodiments set forth in the present disclosure may be susceptible to various modifications, implementations, and/or alternative forms, specific embodiments have been shown by way of example in the drawings and have been described in detail herein. However, it may be understood that the disclosure is not intended to be limited to the particular forms disclosed. The disclosure is to cover all modifications, implementations, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
one or more human interface devices;
an electronic display configured to enter a plurality of power usage modes;
one or more depth sensors configured to detect a plurality of depths of a plurality of zones of a field of view of the one or more depth sensors; and
a controller comprising at least one processor and a memory, wherein the memory comprises machine-readable instructions configured to cause the at least one processor to:
receive the plurality of depths from the one or more depth sensors;
generate an image based on the plurality of depths of the plurality of zones;
apply a machine-learning model to determine that a user is present in the field of view of the one or more depth sensors based on the image;
cause the electronic display to enter a power usage mode of the plurality of power usage modes based on the machine-learning model determining that the user is present in the field of view of the one or more depth sensors;
determine that the one or more human interface devices have been inactive for a threshold duration of time; and
in response to determining that the one or more human interface devices of the electronic device have not been inactive for the threshold duration of time, train the machine-learning model to determine whether the user is present in the field of view of the one or more depth sensors based on the plurality of depths.

2. The electronic device of claim 1, wherein the one or more depth sensors comprise a time-of-flight sensor, an infrared sensor, an ultra-wideband sensor, a radar sensor, a WiFi sensor, a sonar sensor, or any combination thereof.

3. The electronic device of claim 1, wherein the machine-readable instructions are configured to cause the at least one processor to generate the image by:
assigning grayscale values to the plurality of depths; and
aggregating the grayscale values.

4. The electronic device of claim 1, wherein the one or more depth sensors configured to detect the plurality of depths by receiving a plurality of return signals in response to sending a plurality of outgoing signals, and wherein the machine-readable instructions are configured to cause the at least one processor to generate the image by:
assigning grayscale values to a plurality of signal strengths of the plurality of return signals; and
aggregating the grayscale values.

5. The electronic device of claim 1, wherein the machine-readable instructions are configured to cause the at least one processor to generate the image by performing a thresholding technique.

6. The electronic device of claim 1, wherein the machine-readable instructions are configured to cause the at least one processor to process the image by performing an image scaling technique, an interpolation technique, a sharpening technique, a thresholding technique, or any combination thereof.

7. The electronic device of claim 1, wherein the machine-readable instructions are configured to cause the at least one processor to cause the electronic display to enter a second power usage mode of the plurality of power usage modes in response to determining that the user is not present in the field of view of the one or more depth sensors, wherein the second power usage mode comprises a standby mode of the electronic display.

8. The electronic device of claim 7, wherein the standby mode causes the electronic display to turn off.

9. An electronic device, comprising:
one or more human interface devices;
an electronic display configured to enter a plurality of power usage modes;
one or more depth sensors configured to detect a plurality of depths of a plurality of zones of a field of view of the one or more depth sensors; and
a controller comprising at least one processor and a memory, wherein the memory comprises machine-readable instructions configured to cause the at least one processor to:
receive the plurality of depths from the one or more depth sensors;
generate an image based on the plurality of depths of the plurality of zones;
apply a machine-learning model to determine that a user is focused on the electronic device based on the image;
cause the electronic display to enter a power usage mode of the plurality of power usage modes based on the machine-learning model determining that the user is focused on the electronic device;
determine that the one or more human interface devices have been inactive for a threshold duration of time; and
in response to determining that the one or more human interface devices of the electronic device have not been inactive for the threshold duration of time, train the machine-learning model to determine whether the user is focused on the electronic device based on the plurality of depths.

10. The electronic device of claim 9, wherein the plurality of zones of the field of view of the one or more depth sensors consists of a four by four grid.

11. The electronic device of claim 9, wherein the plurality of zones of the field of view of the one or more depth sensors consists of an eight by eight grid.

12. The electronic device of claim 9, wherein the plurality of zones of the field of view of the one or more depth sensors consists of a sixteen by sixteen grid.

13. The electronic device of claim 9, wherein the machine-readable instructions are configured to cause the at least one processor to cause the electronic display to enter a second power usage mode of the plurality of power usage modes in response to determining that the user is not focused on the electronic device, wherein the second power usage mode comprises a power saving mode of the electronic display.

14. The electronic device of claim 13, wherein the power saving mode causes the electronic display to dim.

15. One or more tangible, non-transitory, machine-readable media, comprising machine-readable instructions that cause at least one processor to:
receive a plurality of depth measurements from one or more depth sensors of an electronic device, wherein the one or more depth sensors comprise a radio wave-based depth sensor, a sound wave-based depth sensor, or both;
generate an image based on the plurality of depth measurements;
apply a first machine-learning model to the image, wherein the first machine-learning model is configured to determine that a user is present in a field of view of the one or more depth sensors;
apply a second machine-learning model to the image in response to the first machine-learning model determining that the user is present in the field of view of the one or more depth sensors, wherein the second machine-learning model is configured to determine that the user is focused on the electronic device based on the image;
cause an electronic display of the electronic device to enter a power usage mode in response to the second machine-learning model determining that the user is focused on the electronic device based on the image;
determine that one or more human interface devices of the electronic device have been inactive for a threshold duration of time; and
in response to determining that the one or more human interface devices of the electronic device have not been inactive for the threshold duration of time, train the second machine-learning model using the plurality of depth measurements.

16. The one or more tangible, non-transitory, machine-readable media of claim 15, wherein the power usage mode comprises an operational mode.

17. The one or more tangible, non-transitory, machine-readable media of claim 15, wherein the machine-readable instructions cause the at least one processor to cause the electronic display to enter a standby mode in response to the second machine-learning model determining that the user is not focused on the electronic device based on the image, wherein the standby mode causes the electronic display to turn off.

18. The one or more tangible, non-transitory, machine-readable media of claim 15, wherein the machine-readable instructions cause the at least one processor to cause the electronic display to enter a power saving mode in response to the second machine-learning model determining that the user is not focused on the electronic device based on the image, wherein the power saving mode causes the electronic display to dim.

19. The one or more tangible, non-transitory, machine-readable media of claim 15, wherein the machine-readable instructions cause the at least one processor to receive the plurality of depth measurements in response to determining that the one or more human interface devices of the electronic device have been inactive for the threshold duration of time.

20. The electronic device of claim 1, wherein the one or more human interface devices comprises a keyboard, a mouse, a trackpad, a trackball, or any combination thereof.

21. The electronic device of claim 9, wherein the machine-readable instructions are configured to train the machine-learning model to determine that the user is not focused on the electronic device based on determining that the user is facing away from the electronic device.

* * * * *